(12) United States Patent
Hamada et al.

(10) Patent No.: US 11,929,612 B2
(45) Date of Patent: Mar. 12, 2024

(54) SERVER AND POWER MANAGEMENT METHOD

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 22 days.

(21) Appl. No.: 17/519,709

(22) Filed: Nov. 5, 2021

(65) Prior Publication Data

US 2022/0200335 A1 Jun. 23, 2022

(30) Foreign Application Priority Data

Dec. 23, 2020 (JP) .................. 2020-213629

(51) Int. Cl.
*H02J 3/00* (2006.01)
*B60L 50/70* (2019.01)
*G05B 15/02* (2006.01)
*H02J 13/00* (2006.01)
*H02J 3/46* (2006.01)

(52) U.S. Cl.
CPC ........ *H02J 13/00022* (2020.01); *B60L 50/70* (2019.02); *G05B 15/02* (2013.01); *H02J 3/00* (2013.01); *H02J 3/46* (2013.01)

(58) Field of Classification Search
USPC ........................................... 700/295
See application file for complete search history.

(56) References Cited

U.S. PATENT DOCUMENTS

| | | | |
|---|---|---|---|
| 2009/0043519 A1* | 2/2009 | Bridges | G01D 4/004 702/62 |
| 2013/0162043 A1* | 6/2013 | Ellena | H02J 3/38 307/43 |
| 2015/0063473 A1 | 3/2015 | Nishibayashi et al. | |

(Continued)

FOREIGN PATENT DOCUMENTS

| | | | | |
|---|---|---|---|---|
| CN | 107863785 B | * | 7/2018 | ............. H02J 3/383 |
| CN | 107863785 B | | 7/2018 | |

(Continued)

*Primary Examiner* — Emilio J Saavedra
(74) *Attorney, Agent, or Firm* — Finnegan, Henderson, Farabow, Garrett & Dunner, LLP

(57) ABSTRACT

A first switching unit switches a first power grid from an isolated operation to a grid-connected operation. In switching the first power grid from the isolated operation to the grid-connected operation, the first switching unit determines a master and a slave among a plurality of power adjustment resources and allows the first power grid to be connected to the second power grid after master-slave control by means of the master and the slave such that electric power of the first power grid is in synchronization with electric power of the second power grid. The first switching unit preferentially selects as the master, a power adjustment resource close to a point of connection between the first power grid and the second power grid from among the plurality of power adjustment resources.

15 Claims, 13 Drawing Sheets

(56) References Cited

U.S. PATENT DOCUMENTS

2015/0076903 A1* 3/2015 Kanayama ................ H02J 3/40
                                                                                                  307/31
2017/0005473 A1* 1/2017 Somani ................... H02J 3/381

FOREIGN PATENT DOCUMENTS

| JP | 2015-050834 A | 3/2015 |
| JP | 2016-187291 A | 10/2016 |
| JP | 2018-513662 A | 5/2018 |
| JP | 2020-028198 A | 2/2020 |
| JP | 2020-068544 A | 4/2020 |
| JP | 2020-141520 A | 9/2020 |
| WO | WO 2017/004125 A1 | 1/2017 |

* cited by examiner

《MASTER SELECTION-IN ISOLATION SWITCHING》

A>B>C>D>E>F>G>H

| DER | TYPE | PRIORITY | DISTANCE | COMMUNICATION RATE | OUTPUT (kW) | CAPACITY (kWh) |
|---|---|---|---|---|---|---|
| R21 | EVSE-FCEV | 5 | H | C | B | E |
| R22 | EVSE-BEV | 5 | G | B | B | E |
| R23 | EVSE-FCEV | 5 | C | B | B | E |
| R24 | EVSE-BEV | 6 | A | B | C | F |
| R61 | ESS | 3 | E | A | A | C |
| R62 | ESS | 1 | D | A | A | A |
| R71 | FCS | 2 | F | A | A | B |
| R72 | FCS | 4 | B | A | A | D |

PRIORITY BEING PLACED ON HIGH CAPACITY

FIG.8

《MASTER SELECTION-IN GRID-CONNECTION SWITCHING》    A>B>C>D>E>F>G>H

| DER | TYPE | PRIORITY | DISTANCE | COMMUNICATION RATE | OUTPUT (kW) | CAPACITY (kWh) |
|---|---|---|---|---|---|---|
| R21 | EVSE-FCEV | — | H | C | B | E |
| R22 | EVSE-BEV | 1 | G | B | B | E |
| R23 | EVSE-FCEV | 5 | C | B | B | E |
| R24 | EVSE-BEV | — | A | B | C | F |
| R61 | ESS | 3 | E | A | A | C |
| R62 | ESS | 4 | D | A | A | A |
| R71 | FCS | 2 | F | A | A | B |
| R72 | FCS | 6 | B | A | A | D |

PRIORITY BEING PLACED ON CLOSER DER

TARGET: B OR HIGHER    TARGET: B OR HIGHER

FIG.10

《MASTER SELECTION-IN GRID-CONNECTION SWITCHING》

A>B>C>D>E>F

| DER | TYPE | PRIORITY | DISTANCE | COMMUNICATION RATE | OUTPUT (kW) | CAPACITY (kWh) |
|---|---|---|---|---|---|---|
| R21 | EVSE-FCEV | — | F | C | B | E |
| R22 | EVSE-BEV | — | — | — | — | — |
| R23 | EVSE-FCEV | — | — | — | — | — |
| R24 | EVSE-BEV | — | A | B | C | F |
| R61 | ESS | 2 | D | A | A | C |
| R62 | ESS | 3 | C | A | A | A |
| R71 | FCS | 1 | E | A | A | B |
| R72 | FCS | 4 | B | A | A | D |

↑ PRIORITY BEING PLACED ON CLOSER DER

TARGET: B OR HIGHER    TARGET: B OR HIGHER

FIG.11

《MASTER SELECTION-IN
GRID-CONNECTION SWITCHING》     A>B>C>D>E>F>G>H

| DER | TYPE | PRIORITY | DISTANCE | COMMUNICATION RATE | OUTPUT (kW) | CAPACITY (kWh) |
|---|---|---|---|---|---|---|
| R21 | EVSE-FCEV | 1 | H | A | B | E |
| R22 | EVSE-BEV | 2 | G | A | B | E |
| R23 | EVSE-FCEV | 6 | C | A | B | E |
| R24 | EVSE-BEV | — | A | A | C | F |
| R61 | ESS | 4 | E | A | A | C |
| R62 | ESS | 5 | D | A | A | A |
| R71 | FCS | 3 | F | A | A | B |
| R72 | FCS | 7 | B | A | A | D |

PRIORITY BEING PLACED ON CLOSER DER

TARGET: B OR HIGHER

TARGET: B OR HIGHER

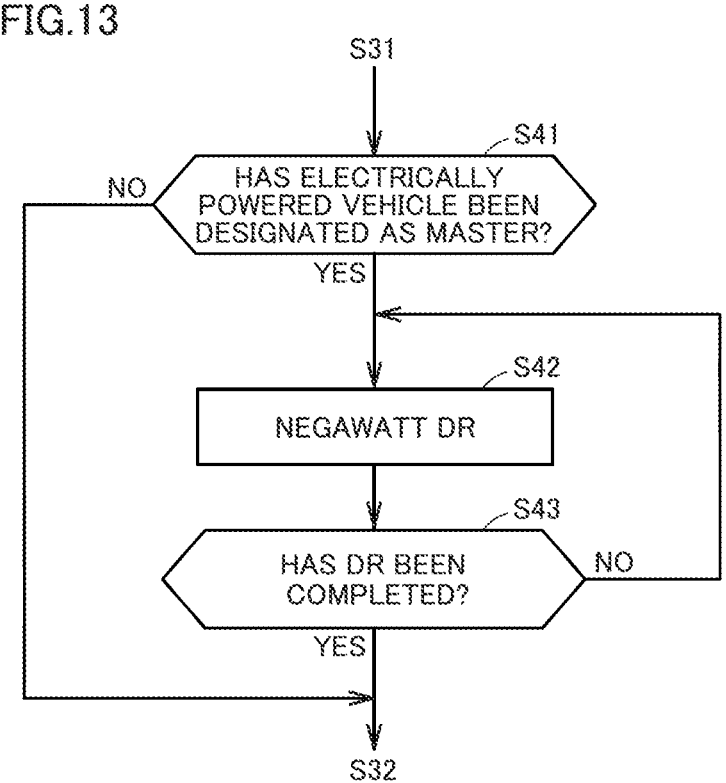

SERVER AND POWER MANAGEMENT METHOD

This nonprovisional application is based on Japanese Patent Application No. 2020-213629 filed with the Japan Patent Office on Dec. 23, 2020, the entire contents of which are hereby incorporated by reference.

BACKGROUND

Field

The present disclosure relates to a server that manages a plurality of power adjustment resources electrically connectable to a power grid and a power management method.

Description of the Background Art

For example, Japanese Patent Laying-Open No. 2020-028198 discloses a method of managing supply and demand of a microgrid by using a plurality of power adjustment resources (specifically, a distributed power supply, a load, and an induction generator with a flywheel) electrically connectable to the microgrid.

SUMMARY

In the method described in Japanese Patent Laying-Open No. 2020-028198, normally, a microgrid performs a grid-connected operation and electric power is supplied from an external power network (specifically, a large-scale commercial power grid) to the microgrid. On the other hand, when the external power network fails, the microgrid is switched to an isolated operation and balance in supply and demand of the microgrid is adjusted by turning off a load connected to the microgrid.

When the external power network recovers from failure, the microgrid returns to the grid-connected operation. When the microgrid switches from the isolated operation to the grid-connected operation, however, electric power of the microgrid is not necessarily in synchronization with electric power of the external power network. Therefore, electric power of the microgrid may become unstable at the time of parallel in (connection) of the microgrid to the external power network. Japanese Patent Laying-Open No. 2020-028198 does not discuss such a problem.

The present disclosure was made to solve the problem above, and an object thereof is to suppress instability of electric power of a power grid in switching of the power grid from an isolated operation to a grid-connected operation.

A server according to the present disclosure is configured to manage electric power of a first power grid. The first power grid is configured to be connected to and disconnected from a second power grid. The server includes a resource manager and a first switching unit. The resource manager is configured to manage a plurality of power adjustment resources electrically connectable to the first power grid. The first switching unit is configured to switch the first power grid from an isolated operation to a grid-connected operation. The first power grid is interconnected with the second power grid in the grid-connected operation. The first switching unit is configured to, in switching the first power grid from the isolated operation to the grid-connected operation, determine a master and a slave among the plurality of power adjustment resources and to allow the first power grid to be connected to the second power grid after master-slave control by means of the master and the slave such that electric power of the first power grid is in synchronization with electric power of the second power grid. The first switching unit is configured to preferentially select as the master, a power adjustment resource close to a point of connection between the first power grid and the second power grid from among the plurality of power adjustment resources.

The point of connection between the first power grid and the second power grid is also referred to as a "grid-connection point" below. A distance from the grid-connection point to the power adjustment resource is also referred to as a "grid-connection point distance." Switching of the first power grid from the isolated operation to the grid-connected operation is also referred to as "grid-connection switching." Switching of the first power grid from the grid-connected operation to the isolated operation is also referred to as "isolation switching."

In the server, before parallel in (connection) of the first power grid to the second power grid, master-slave control is carried out so that electric power of the first power grid is in synchronization with electric power of the second power grid. In addition, the server preferentially selects the power adjustment resource close to the grid-connection point as the master.

As the power adjustment resource is more distant from the grid-connection point, an electric wire from the grid-connection point to the power adjustment resource is longer. In bringing electric power of the first power grid in conformity with electric power of the second power grid by using the power adjustment resource distant from the grid-connection point, an inductance of the electric wire from the grid-connection point to the power adjustment resource becomes high. Therefore, deviation between electric power of the first power grid and electric power of the second power grid is likely. Therefore, master-slave control in which a power adjustment resource close to the grid-connection point is designated as the master can achieve more accurate synchronization of electric power of the first power grid with electric power of the second power grid than master-slave control in which a power adjustment resource distant from the grid-connection point is designated as the master.

The server highly accurately synchronizes electric power of the first power grid with electric power of the second power grid, and thereafter allows the first power grid to be connected to the second power grid. Thus, instability of electric power of the first power grid in switching of the first power grid from the isolated operation to the grid-connected operation is suppressed.

One master or a plurality of masters may be designated for master-slave control. In master-slave control, a plurality of masters may operate in coordination to set a frequency and a voltage of the first power grid. At least one and at most four masters may be designated. The number of slaves is larger than the number of masters. At least five, at least thirty, or at least one hundred slaves may be designated. In master-slave control, each slave may be operated in accordance with a frequency and a voltage determined by the master.

The first switching unit may be configured to select the master based on communication performance and output performance of the power adjustment resource.

The first switching unit selects the master in consideration of communication performance and output performance of the power adjustment resource in addition to the grid-connection point distance (a distance from the point of connection) of the power adjustment resource. Communication performance and output performance of the power adjustment resource are different depending on a type of the power adjustment resource. In master-slave control described previously, the grid-connection point distance, communication performance, and output performance of the master affect accuracy of synchronization. As the grid-connection point distance of the master is shorter, accuracy in synchronization tends to be higher. As communication performance of the master is higher, accuracy in synchronization tends to be higher. As output performance of the master is higher, accuracy in synchronization tends to be higher. According to the configuration, an appropriate master tends to be selected in accordance with a condition at the time of grid-connection switching and accuracy in synchronization tends to be higher.

The first switching unit may be configured to exclude a first power adjustment resource and a second power adjustment resource from power adjustment resources that are responsive to a synchronization command, the first power adjustment resource having a communication rate lower than a first threshold value, the second power adjustment resource having maximum output power lower than a second threshold value, and to select as the master, one power adjustment resource closest to the grid-connection point from among remaining power adjustment resources after the exclusion.

In the configuration, a power adjustment resource too low in communication rate and a power adjustment resource too low in maximum output power are excluded from candidates for the master. Then, a power adjustment resource sufficiently high in each of communication rate and maximum output power and shortest in grid-connection point distance is selected as the master. As master-slave control is carried out by means of the master thus selected, synchronization described previously tends to highly accurately be achieved.

The plurality of power adjustment resources may include an electrically powered vehicle. By utilizing the electrically powered vehicle, sufficient power adjustment resources tend to be secured. Since the electrically powered vehicle moves, the grid-connection point distance of the electrically powered vehicle may vary. By carrying out master-slave control in which an electrically powered vehicle connected to electric vehicle supply equipment (EVSE) close to the grid-connection point is designated as the master, synchronization described previously can highly accurately be achieved.

The electrically powered vehicle refers to a vehicle configured to travel with electric power supplied from a power storage device mounted on the vehicle. The electrically powered vehicle includes not only a battery electric vehicle (BEV) and a plug-in hybrid electric vehicle (PHEV) but also a fuel cell electric vehicle (FCEV) and a range extender BEV. The power storage device should only be configured to be able to store electric power and any storage method is applicable. The power storage device may store electric power (electric energy) as it is, or may convert electric power into another type of energy (for example, liquid fuel or gaseous fuel as an energy source) and store resultant energy. Examples of the power storage device include a secondary battery, a fuel cell, and power to gas (PtG) equipment.

The plurality of power adjustment resources may further include a stationary power storage. The first switching unit may be configured to request, when the electrically powered vehicle is designated as the master, a user of at least one power adjustment resource included in the plurality of power adjustment resources to reduce demand of the first power grid before master-slave control.

The electrically powered vehicle tends to be lower in capacity (kWh) than a stationary power storage. When the capacity of the master is insufficient for demand of the first power grid, electric power of the first power grid may not be stabilized under master-slave control. Then, in the configuration, when the electrically powered vehicle is designated as the master, a user of at least one power adjustment resource is requested to reduce demand of the first power grid before master-slave control. As demand of the first power grid is reduced in response to this request, the capacity of the master insufficient for demand of the first power grid is suppressed.

The request may be sent to an energy management system (EMS) or a terminal of a user of the power adjustment resource. The terminal of the user of the power adjustment resource may be registered in advance in the server in association with the user of the power adjustment resource. The terminal of the user of the power adjustment resource may be a terminal provided in the power adjustment resource or a portable terminal carried by the user.

The electrically powered vehicle may be a fuel cell electric vehicle. By utilizing an environmentally-friendly fuel cell electric vehicle, a ratio of clean energy in the first power grid is more readily raised.

The server may further include a second switching unit that determines a master and a slave among the plurality of power adjustment resources in switching the first power grid from the grid-connected operation to the isolated operation. The second switching unit may be configured to preferentially select as the master, a power adjustment resource high in capacity from among the plurality of power adjustment resources.

In the configuration, in isolation switching, the power adjustment resource high in capacity is preferentially selected as the master. Under master-slave control described previously by means of the master of high capacity, electric power of the first power grid tends to be stabilized. According to the configuration, electric power of the first power grid is more readily stabilized in the isolated operation.

The first switching unit may be configured to determine timing to switch the first power grid from the isolated operation to the grid-connected operation based on balancing capability of the first power grid during the isolated operation of the first power grid.

From a point of view of cost for electric power, the isolated operation is more advantageous than the grid-connected operation. On the other hand, when balancing capability of the first power grid (including balancing capability of a plurality of power adjustment resources) is insufficient, quality of electric power of the first power grid tends to lower, and it becomes difficult to maintain the isolated operation in the first power grid. Since the server determines timing of grid-connection switching based on balancing capability of the first power grid, grid-connection switching is more readily made at appropriate timing.

The first power grid may be a microgrid. The second power grid may be a commercial power grid provided by an electric utility. Each of the plurality of power adjustment resources may include a power conversion circuit. In master-slave control, the master electrically connected to the first power grid may carry out voltage control by means of the power conversion circuit and the slave electrically connected to the first power grid may carry out current control by means of the power conversion circuit.

According to the configuration, the server more readily appropriately operates the microgrid. Under voltage control by means of the master and current control by means of the slave, synchronization under master-slave control in grid-connection switching described previously is more readily appropriately achieved.

A power management method according to the present disclosure is a method of managing electric power of a first power grid. The method includes determining a master and a slave among a plurality of power adjustment resources electrically connectable to the first power grid in switching the first power grid from an isolated operation to a grid-connected operation, the first power grid being interconnected with a second power grid in the grid-connected operation, carrying out master-slave control by means of the master and the slave such that electric power of the first power grid is in synchronization with electric power of the second power grid, and connecting the first power grid to the second power grid after synchronization under master-slave control. In determining the master and the slave, a power adjustment resource close to a point of connection between the first power grid and the second power grid is preferentially selected as the master from among the plurality of power adjustment resources.

According to the power management method as well, similarly to the server described previously, synchronization is highly accurately achieved under master-slave control before grid-connection switching. Instability of the first power grid due to grid-connection switching is thus suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a diagram showing a first example of priority in selection of the master in grid-connection switching in the power management method according to the embodiment of the present disclosure.

FIG. 10 is a diagram showing a second example of priority in selection of the master in grid-connection switching in the power management method according to the embodiment of the present disclosure.

FIG. 11 is a diagram showing a modification of the priority in selection of the master in grid-connection switching shown in FIG. 8.

FIG. 13 is a diagram showing a modification of processing shown in FIG. 7.

DESCRIPTION OF THE PREFERRED EMBODIMENTS

Figure 1:
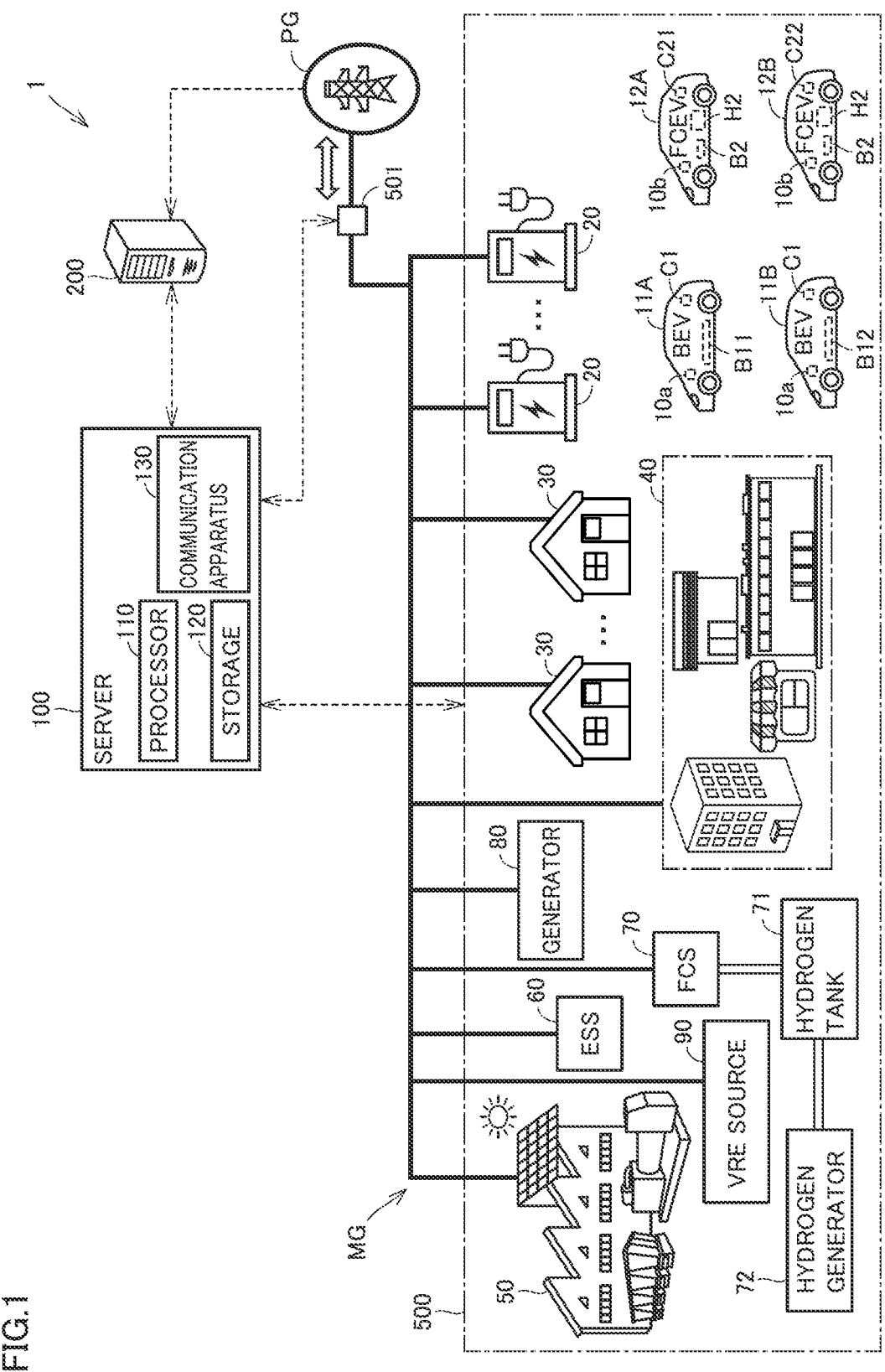
FIG. 1 is a diagram showing a schematic configuration of an electric power system according to an embodiment of the present disclosure.

An embodiment of the present disclosure will be described in detail with reference to the drawings. The same or corresponding elements in the drawings have the same reference characters allotted and description thereof will not be repeated. An energy management system is denoted as "EMS" below. A distributed energy resource is denoted as "DER". An electronic control unit mounted on a vehicle is denoted as an "ECU".

FIG. 1 is a diagram showing a schematic configuration of an electric power system according to an embodiment of the present disclosure. Referring to FIG. 1, an electric power system 1 includes a power grid PG, a microgrid MG, servers 100 and 200, a DER group 500, and a power reception and transformation facility 501.

Server 100 is a computer that manages supply and demand of microgrid MG. Server 100 belongs to a manager of microgrid MG. Server 100 corresponds to a community EMS (CEMS) server. Microgrid MG is a power network that supplies electric power to one city (for example, a smart city) as a whole. A power line for networking a plurality of DERs in microgrid MG may be a private power line. Microgrid MG is configured to be connected to and disconnected from power grid PG. Microgrid MG corresponds to an exemplary "first power grid" according to the present disclosure.

Server 200 is a computer that manages supply and demand of power grid PG. Power grid PG is a power network constructed by a power plant and a power transmission and distribution (T&D) facility that are not shown. The electric power company corresponds to a general power T&D utility and maintains and manages power grid PG (commercial power grid). The electric power company corresponds to a manager of power grid PG. Server 200 belongs to the electric power company. In this embodiment, the electric power company and power grid PG correspond to an exemplary "electric utility" and an exemplary "second power grid" according to the present disclosure, respectively.

Power reception and transformation facility 501 is provided at a point of interconnection (a power reception point) of microgrid MG and configured to switch between parallel in (connection) and parallel off (disconnection) between power grid PG and microgrid MG. Power reception and transformation facility 501 is located at a point of connection between microgrid MG and power grid PG.

When microgrid MG is performing a grid-connected operation as being connected to power grid PG, power reception and transformation facility 501 receives alternating-current (AC) power from power grid PG, down-converts received electric power, and supplies down-converted electric power to microgrid MG. While microgrid MG is performing an isolated operation as being disconnected from power grid PG, electric power is not supplied from power grid PG to microgrid MG. Power reception and transformation facility 501 includes a switch on a high voltage side (a primary side) (for example, a section switch, an isolator, a breaker, and a load break switch), a transformer, a protection relay, a measurement instrument, and a controller. Server 100 is configured to receive information (for example, a power waveform) on microgrid MG from power reception and transformation facility 501 and to indicate parallel in/parallel off to power reception and transformation facility 501.

Server 100 is configured to communicate with each of server 200 and DER group 500. A protocol of communication may be OpenADR. DER group 500 includes a plurality of DERs electrically connectable to microgrid MG. Server 100 is configured to manage the plurality of DERs included in DER group 500. Server 100 may carry out demand response (DR) on DER group 500 when it is requested by server 200 to adjust supply and demand of power grid PG. Alternatively, server 100 may carry out DR on DER group 500 in response to a request from a supply and demand adjustment market. Alternatively, server 100 may carry out DR on DER group 500 in order to adjust supply and demand of microgrid MG.

The plurality of DERs included in DER group 500 are electrically connected to one another through microgrid MG. DER group 500 includes electric vehicle supply equipment (EVSE) 20, a house 30, a commercial facility 40, a factory 50, an energy storage system (ESS) 60, a fuel cell system (FCS) 70, a generator 80, and a variable renewable energy source 90. Each of these may function as a DER.

DER group 500 further includes battery electric vehicles (BEVs) 11A and 11B and fuel cell electric vehicles (FCEVs) 12A and 12B. EVSE 20 functions as the DER as being electrically connected to a vehicle (for example, the BEV or the FCEV). For example, as a charging connector of EVSE 20 is inserted (plugged) into an inlet of the vehicle, EVSE 20 and the vehicle are electrically connected to each other. Each of BEVs 11A and 11B and FCEVs 12A and 12B corresponds to an exemplary "electrically powered vehicle" according to the present disclosure.

Though FIG. 1 shows only two BEVs and only two FCEVs, any number of vehicles may be included in DER group 500. Ten or more or one hundred or more vehicles may be included. DER group 500 may include a personally owned vehicle (POV) or a mobility as a service (MaaS) vehicle. The MaaS vehicle is a vehicle managed by a MaaS entity. Any number of pieces of EVSE 20, houses 30, commercial facilities 40, factories 50, ESSs 60, FCSs 70, generators 80, and variable renewable energy sources 90 may also be included in DER group 500.

Each of BEVs 11A and 11B includes an ECU 10a and a communication apparatus C1. ECU 10a is configured to control vehicle-mounted equipment. Each of BEVs 11A and 11B is configured to wirelessly communicate with server 100 through communication apparatus C1. BEV 11A and BEV 11B include a power storage B11 and a power storage B12, respectively. Power storage B12 is lower in capacity (kWh) and maximum output power (kW) than power storage B11. Electric power stored in each of power storages B11 and B12 is used for driving a motor (not shown) for travel of the BEV or consumed in equipment mounted on the BEV.

Each of FCEVs 12A and 12B includes ECU 10b, a power generation device H2, and a power storage B2. ECU 10b is configured to control vehicle-mounted equipment. Power generation device H2 includes a hydrogen tank in which hydrogen is retained and a fuel cell that generates electric power by chemical reaction between hydrogen and oxygen (neither of which is shown). The fuel cell generates electric power by using hydrogen supplied from the hydrogen tank. Electric power generated by power generation device H2 is used for driving a motor (not shown) for travel of the FCEV, consumed in equipment mounted on the FCEV, or stored in power storage B2. A user of the FCEV can add hydrogen at a hydrogen station (not shown) provided in the city. FCEV 12A and FCEV 12B include a communication apparatus C21 and a communication apparatus C22, respectively. FCEV 12A is configured to wirelessly communicate with server 100 through communication apparatus C21. FCEV 12B is configured to wirelessly communicate with server 100 through communication apparatus C22. Communication apparatus C22 is lower in communication rate than communication apparatus C21.

DER group 500 includes a plurality of pieces of EVSE 20 (for example, a charging infrastructure constructed in the city). EVSE 20 is public EVSE that can be used by a user of a vehicle after prescribed authentication. An authentication method may be authentication by a charging card or authentication by communication (for example, Plug and Charge).

DER group 500 includes a plurality of houses 30 (for example, houses of people who live in the city). House 30 includes various home electrical appliances (for example, a lighting device, an air-conditioning facility, kitchen equipment, information equipment, a television, a refrigerator, and a washing machine). House 30 may include at least one of a charger-discharger (for example, home EVSE), a variable renewable energy source (for example, a photovoltaic panel provided on a roof), an ESS, an FCS, and a cogeneration system (for example, a water heater or a heat pump water heater that uses heat generated in self-generation). Supply and demand of energy in house 30 is managed, for example, by a not-shown home EMS (HEMS). Microgrid MG and each house 30 are connected to each other to supply and receive electric power therebetween. In this embodiment, server 100 and each house 30 communicate with each other through the HEMS.

Commercial facility 40 includes, for example, office buildings and stores. Examples of the stores include department stores, shopping centers, supermarkets, or convenience stores. Supply and demand of energy in each facility included in commercial facility 40 is managed, for example, by a not-shown building EMS (BEMS). The BEMS may manage supply and demand of energy individually for each facility or may collectively manage supply and demand of energy in a plurality of facilities. Each facility included in commercial facilities 40 and microgrid MG are connected to each other to supply and receive electric power therebetween. In this embodiment, server 100 communicates with commercial facility 40 through the BEMS.

Factory 50 may be, for example, a car factory or another factory. Factory 50 includes, for example, a production line and a concentrated heat source for air-conditioning. Factory 50 may include at least one of a variable renewable energy source (for example, a photovoltaic power generation facility or a wind power generation facility), EVSE, an ESS, an FCS, a generator (for example, a gas turbine generator or a diesel generator), and a cogeneration system. Supply and demand of energy in factory 50 is managed, for example, by a not-shown factory EMS (FEMS). Microgrid MG and factory 50 are connected to each other to supply and receive electric power therebetween. In this embodiment, server 100 and factory 50 communicate with each other through the FEMS.

ESS 60 is a stationary power storage configured to be chargeable from and dischargeable to microgrid MG. For example, a lithium ion battery, a lead-acid battery, a nickel metal hydride battery, a redox flow battery, or a sodium sulfur (NAS) battery may be adopted as ESS 60. Surplus electric power generated by variable renewable energy source 90 may be stored in ESS 60.

FCS 70 includes a stationary fuel cell that generates electric power by chemical reaction between hydrogen and oxygen. FCS 70 is connected to a hydrogen tank 71 that is connected to a hydrogen generator 72. FCS 70 is configured to generate electric power by using hydrogen supplied from hydrogen tank 71 and to supply generated electric power to microgrid MG. Hydrogen generator 72 generates hydrogen and supplies generated hydrogen to hydrogen tank 71. Any method can be adopted as a hydrogen generation method. For example, such a known method as a by-product hydrogen method, water electrolysis, a fossil fuel reforming method, a biomass reforming method, or an iodine-sulfur (IS) process may be adopted for hydrogen generator 72. Hydrogen generator 72 may generate hydrogen by using electric power supplied from microgrid MG or by using surplus electric power generated by variable renewable energy source 90. Server 100 may control hydrogen generator 72 such that a remaining amount of hydrogen in hydrogen tank 71 is not smaller than a prescribed value.

Generator 80 is a stationary generator that generates electric power by using fossil fuel. Generator 80 may be, for example, a gas turbine generator or a diesel generator. Generator 80 may be used as an emergency power supply.

Variable renewable energy source 90 is a power supply that varies in generated power output depending on a weather condition, and it provides generated electric power to microgrid MG. Electric power generated by variable renewable energy source 90 corresponds to variable renewable energy (VRE). Variable renewable energy source 90 includes, for example, a photovoltaic power generation facility and a wind power generation facility.

Server 100 includes a processor 110, a storage 120, and a communication apparatus 130. Processor 110 may be implemented by a central processing unit (CPU). Storage 120 is configured to store various types of information. Storage 120 stores not only a program executed by processor 110 but also information (for example, a map, a mathematical expression, and various parameters) to be used by a program. Communication apparatus 130 includes various communication interfaces (I/Fs). Server 100 is configured to communicate with the outside through communication apparatus 130.

Server 100 controls DER group 500 connected to microgrid MG to function as a virtual power plant (VPP). More specifically, server 100 remotely controls DER group 500 as being integrated as if the DERs functioned as a single power plant according to an energy management technology that makes use of the Internet of Things (IoT). Each DER included in DER group 500 corresponds to an exemplary "power adjustment resource" according to the present disclosure.

Figure 2:
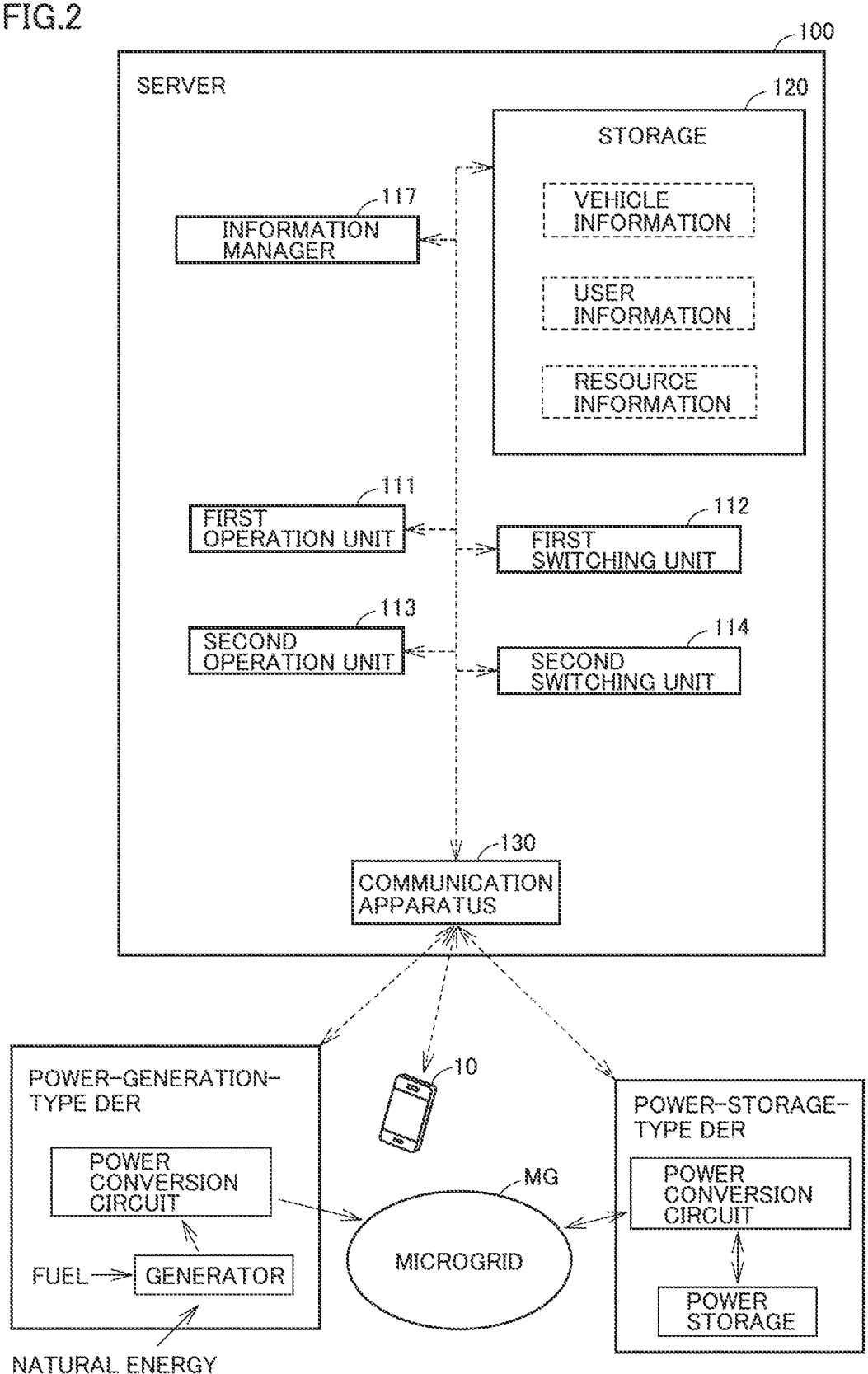
FIG. 2 is a functional block diagram showing a component of a server for each function according to the embodiment of the present disclosure.

FIG. 2 is a functional block diagram showing a component of server 100 for each function. Referring to FIG. 2 together with FIG. 1, server 100 includes a first operation unit 111, a first switching unit 112, a second operation unit 113, a second switching unit 114, and an information manager 117. Each unit is implemented, for example, by processor 110 shown in FIG. 1 and a program in storage 120 executed by processor 110. Without being limited as such, each unit may be implemented by dedicated hardware (electronic circuitry). Server 100 according to this embodiment corresponds to an exemplary "server" according to the present disclosure.

Server 100 is configured to communicate with each of a portable terminal 10 and a DER through communication apparatus 130.

A user of each DER included in DER group 500 carries portable terminal 10. Though FIG. 2 shows only a single portable terminal 10, portable terminal 10 is carried by each DER user. In this embodiment, a smartphone equipped with a touch panel display is adopted as portable terminal 10. Without being limited thereto, any portable terminal can be adopted as portable terminal 10, and a tablet terminal, a wearable device (for example, a smart watch), an electronic key, or the like can also be adopted. Prescribed application software (which is simply referred to as an "application" below) is installed in portable terminal 10. Portable terminal 10 is configured to exchange information with server 100 through the application.

Information manager 117 is configured to manage information on each user (which is also referred to as "user information" below) registered in server 100, information on each vehicle (which is also referred to as "vehicle information" below) registered in server 100, and information on each stationary DER (which is also referred to as "resource information" below) registered in server 100. The user information, the vehicle information, and the resource information are stored in storage 120 as being distinguished for each user, for each vehicle, or for each DER based on identification information (ID). Information manager 117 according to this embodiment corresponds to an exemplary "resource manager" according to the present disclosure.

Each vehicle registered in server 100 can function as a DER by being connected to EVSE 20. As server 100 remotely controls the vehicle connected to EVSE 20 through wireless communication, the vehicle is caused to function as the DER. The vehicle information includes vehicle specs (for example, a capacity and charging and discharging performance of the power storage), a position of a vehicle, and remaining power (for example, a state of charge (SOC)) of a vehicle-mounted battery. The position and the state (for example, the SOC) of the vehicle are obtained by various sensors mounted on each vehicle and transmitted from each vehicle to server 100. Each vehicle may sequentially transmit recent position and state of the vehicle every prescribed cycle or may collectively transmit accumulated data (positions and states of the vehicle) at prescribed timing (for example, at the time of end of travel or at the time of connection of the charging connector).

EVSE 20, house 30, commercial facility 40, factory 50, ESS 60, FCS 70, generator 80, and variable renewable energy source 90 are registered in server 100 as stationary DERs. The resource information includes a position, a state, and specs (for example, maximum output power, a capacity, and a communication rate) of each stationary DER. For example, the state of EVSE 20 includes whether or not a vehicle is connected thereto. The state of EVSE 20 to which a BEV is connected includes a state (for example, an active or inactive state of the ECU, an SOC of the power storage, and charging and discharging power of the power storage) of that BEV. The state of EVSE 20 to which an FCEV is connected includes a state (for example, an active or inactive state of the ECU, a remaining amount of hydrogen in the power generation device, electric power generated by the power generation device and reserve power generation capacity of the power generation device, an SOC of the power storage, and charging and discharging power of the power storage) of that FCEV. The state of each of house 30, commercial facility 40, and factory 50 includes consumed power. The state of ESS 60 includes an active or inactive state of a control system, an SOC, and charging and discharging power. The state of each of FCS 70 and generator 80 includes an active or inactive state of the control system, generated electric power, and reserve power generation capacity. The state of FCS 70 further includes the remaining amount of hydrogen in hydrogen tank 71. The state of variable renewable energy source 90 includes generated electric power. Server 100 can obtain the resource information by communicating with each stationary DER.

The user information includes a communication address of portable terminal 10 carried by a user, a vehicle ID of a vehicle belonging to the user, a resource ID of a stationary DER belonging to the user, an electricity fee, and incentive information (for example, an amount of acquired incentive).

Each user registered in server 100 has signed a contract for using electric power of microgrid MG with a manager of microgrid MG (which is also referred to as an "MG manager" below). Under this contract, a user (demand side) who uses electric power supplied from microgrid MG is obliged to pay a prescribed electricity fee to the MG manager. A DER user who has made power adjustment of microgrid MG in response to a request (for example, DR) from the MG manager obtains the right to receive an incentive determined in advance in the contract from the MG manager. Information manager 117 manages the incentive to be given to the DER user who has made power adjustment of microgrid MG. The incentive may be paid with a general currency or a virtual currency that can be used only in the city.

Each DER included in DER group 500 is categorized into a power-generation-type DER, a power-storage-type DER, and a load-type DER.

In the power-generation-type DER, the generator generates electric power with natural energy (for example, solar rays or wind power) or fuel (for example, light oil, natural gas, or hydrogen) and generated electric power is provided to microgrid MG through a power conversion circuit. In the power-storage-type DER, electric power is exchanged between the power storage and microgrid MG through the power conversion circuit. The power conversion circuit in each DER is configured to operate in accordance with a control signal from server 100 and to carry out prescribed power conversion. In this embodiment, the power conversion circuit includes an inverter and a PLL. The power conversion circuit may include a relay that switches between connection and disconnection between a DER and microgrid MG.

For example, in DER group 500 shown in FIG. 1, ESS 60 functions as the power-storage-type DER. Each of FCS 70, generator 80, and variable renewable energy source 90 functions as the power-generation-type DER. Though electric power generated by variable renewable energy source 90 is basically determined by a weather condition, power generation output of variable renewable energy source 90 can be restricted.

The BEV (for example, BEVs 11A and 11B shown in FIG. 1) functions as the power-storage-type DER. The BEV functions as the power-storage-type DER by carrying out charging and discharging of the power storage connected to microgrid MG. The FCEV (for example, FCEVs 12A and 12B shown in FIG. 1) functions as the power-generation-type DER. The FCEV functions as the power-generation-type DER by providing electric power generated by the power generation device to microgrid MG. The FCEV may be configured to function as the power-storage-type DER. When the capacity and charging and discharging performance of the power storage are sufficient, the FCEV can function also as the power-storage-type DER. The power conversion circuit may be mounted on a vehicle (for example, the BEV or the FCEV) or on EVSE 20. For example, direct-current (DC) power may be provided from the vehicle to EVSE 20 of the DC type and the inverter contained in EVSE 20 may carry out DC/AC conversion. The vehicle-mounted inverter may carry out DC/AC conversion on electric power discharged from the power storage included in the vehicle and resultant AC power may be provided from the vehicle to EVSE of the AC type.

Though not shown in FIG. 2, an electrical appliance that consumes electric power of microgrid MG can also function as the DER (the load-type DER). As electrical load of the electrical appliance connected to microgrid MG is higher, an amount of power consumption in microgrid MG is larger. For example, a demand side of each of house 30, commercial facility 40, and factory 50 shown in FIG. 1 can adjust supply and demand of microgrid MG by adjusting the electrical load of the electrical appliance.

In server 100, first operation unit 111 controls a DER that functions as balancing capability (reserve) of microgrid MG during the grid-connected operation of microgrid MG. The DER that functions as balancing capability of microgrid MG is also referred to as "reserve DER" below. More specifically, first operation unit 111 carries out current control of microgrid MG by means of the reserve DER during the grid-connected operation of microgrid MG. The reserve DER contains, for example, a power conversion circuit including an inverter and a phase locked loop (PLL). First operation unit 111 may adopt at least one of ESS 60, FCS 70, and power generator 80 always connected to microgrid MG as the reserve DER. Alternatively, by carrying out DR, first operation unit 111 may adopt at least one of house 30, commercial facility 40, factory 50, and EVSE 20 (more specifically, EVSE 20 connected to the vehicle) as the reserve DER.

In this embodiment, first operation unit 111 detects an amplitude and a phase of a voltage waveform of power grid PG by using the PLL of the reserve DER and controls the inverter of the reserve DER such that electric power of microgrid MG is in synchronization with electric power of power grid PG. First operation unit 111 controls an AC current by means of the inverter of the reserve DER to cause the current that flows through microgrid MG to follow a target value while it provides feedback of a current detection value. First operation unit 111 may divide the current that flows through microgrid MG into a watt current component and a reactive current component to control an output voltage from the inverter of the reserve DER such that each of the watt current component and the reactive current component is closer to the target value.

First switching unit 112 is configured to determine the master and the slave from DER group 500 in grid-connection switching of microgrid MG (that is, in switching microgrid MG from the isolated operation to the grid-connected operation with microgrid MG being interconnected with power grid PG) and to allow microgrid MG to be connected to power grid PG after master-slave control by means of the master and the slave such that electric power of microgrid MG is in synchronization with electric power of power grid PG. First switching unit 112 carries out master-slave control such that electric power of microgrid MG is in synchronization with electric power of power grid PG by sending a synchronization command to each of the master and the slave.

First switching unit 112 according to this embodiment selects one master in accordance with prescribed priority from among ESS 60, FCS 70, and EVSE 20 (more specifically, EVSE 20 connected to the vehicle) present in a range within a prescribed distance from the grid-connection point (power reception and transformation facility 501). Though details will be described later, first switching unit 112 is configured to preferentially select a DER close to the grid-connection point (power reception and transformation facility 501) as the master (see FIG. 8). First switching unit 112 excludes a DER that is not responsive to the synchronization command (for example, a DER start-up of a control system of which is not in time for the synchronization command) from master candidates. First switching unit 112 excludes also a DER, at least one of communication performance and output performance of which is insufficient, from master candidates. First switching unit 112 designates as slaves, all DERs (that is, DERs priority of which is second highest or lower) not selected as the master among master candidates (DERs that have not been excluded). When there is a DER that is responsive to the synchronization command other than master candidates, the DER other than the master candidates may be designated as the slave.

Under master-slave control by first switching unit 112, the master electrically connected to microgrid MG carries out voltage control by means of the power conversion circuit (including the inverter) and each slave electrically connected to microgrid MG carries out current control by means of the power conversion circuit (including the inverter). The master is operated for voltage control. Voltage control may be constant voltage constant frequency (CVCF) control. As first switching unit 112 controls the master to provide AC power at a constant voltage and at a constant frequency, the frequency and the voltage of microgrid MG can be determined. Each slave is operated for current control in accordance with the frequency and the voltage determined by the master.

Second switching unit 114 is configured to determine the master and the slave from DER group 500 in isolation switching of microgrid MG (that is, in switching microgrid MG from the grid-connected operation to the isolated operation). Second switching unit 114 according to this embodiment selects one master in accordance with prescribed priority from among ESS 60, FCS 70, and EVSE 20 (more specifically, EVSE 20 connected to the vehicle) present in a range within a prescribed distance from the grid-connection point (power reception and transformation facility 501). Though details will be described later, second switching unit 114 is configured to preferentially select as the master, a DER high in capacity from DER group 500 (see FIG. 5). Second switching unit 114 excludes a DER (for example, a DER start-up of a control system of which is not in time for the adjustment command) that is not responsive to an adjustment command which will be described later from master candidates. Second switching unit 114 designates as slaves, all DERs (that is, DERs priority of which is second highest or lower) not selected as the master among master candidates (DERs that have not been excluded). When there is a DER that is responsive to an adjustment command other than master candidates, the DER other than the master candidates may be designated as the slave.

Second operation unit 113 controls the reserve DER during the isolated operation of microgrid MG. More specifically, second operation unit 113 carries out master-slave control by means of the master and the slave determined by second switching unit 114 during the isolated operation of microgrid MG. For example, second operation unit 113 carries out master-slave control to stabilize electric power of microgrid MG by sending an adjustment command to each of the master and the slave. Under this master-slave control as well, as in master-slave control (control for synchronization) by first switching unit 112 described previously, the master electrically connected to microgrid MG carries out voltage control by means of the power conversion circuit and each slave electrically connected to microgrid MG carries out current control by means of the power conversion circuit. The master is operated, for example, for CVCF control. Each slave is operated for current control in accordance with the frequency and the voltage determined by the master.

Second operation unit 113 may change at least one of the master and the slave during the isolated operation of microgrid MG. Second operation unit 113 may change at least one of the master and the slave, for example, before at least one of the master and the slave is not responsive to the adjustment command. Second operation unit 113 may increase or decrease the number of slaves as necessary during the isolated operation of microgrid MG. Second operation unit 113 may increase slaves, for example, by DR.

Figure 3:
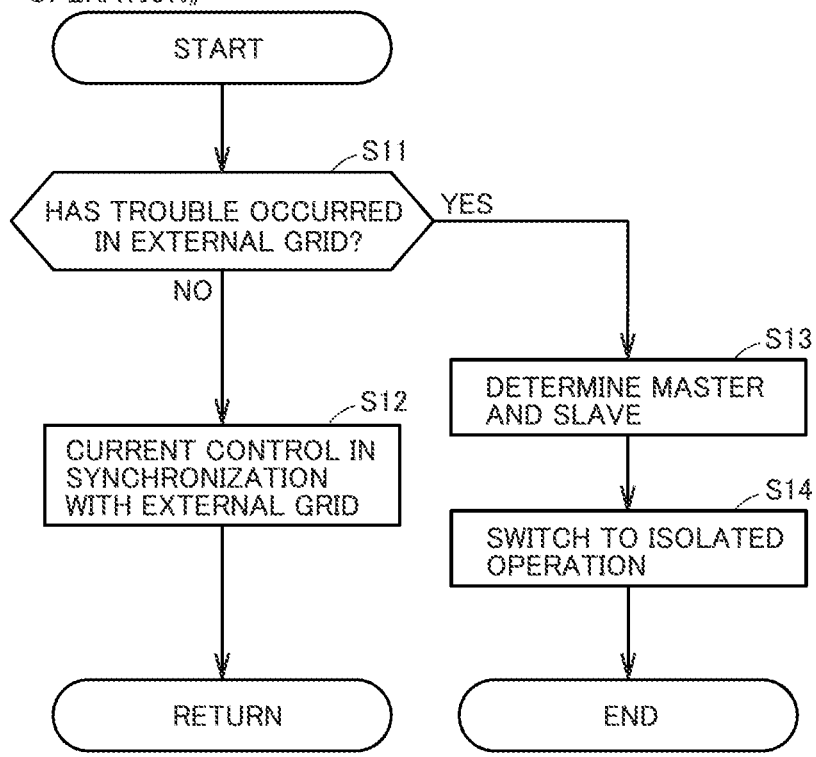
FIG. 3 is a flowchart showing power adjustment control carried out by the server during a grid-connected operation of a microgrid shown in FIG. 1.

FIG. 3 is a flowchart showing power adjustment control carried out by server 100 during the grid-connected operation of microgrid MG. Referring to FIG. 3 together with FIGS. 1 and 2, in step (which is simply denoted as "S" below) 11, second switching unit 114 determines whether or not a trouble such as failure has occurred in power grid PG (external grid). When power grid PG is normal (NO in S11), second switching unit 114 allows the process to proceed to S12 in order to continue the grid-connected operation.

In S12, first operation unit 111 has the reserve DER operate under current control such that electric power of microgrid MG is in synchronization with electric power of power grid PG (external grid). First operation unit 111 adjusts a current of microgrid MG (and balance between supply and demand of microgrid MG) by means of the reserve DER. During the grid-connected operation of microgrid MG, server 100 repeatedly adjusts electric power through processing in S12.

When a trouble (for example, failure) has occurred in power grid PG (YES in S11), second switching unit 114 allows the process to proceed to S13 in order to make switching from the grid-connected operation to the isolated operation. In S13, second switching unit 114 determines the master and the slave from DER group 500. Exemplary selection of the master in isolation switching will be described with reference to FIGS. 4 and 5 below. In the description below, at processing timing in S13, each DER shown in FIG. 4 is assumed to be in a state responsive to an adjustment command from server 100.

Figure 4:
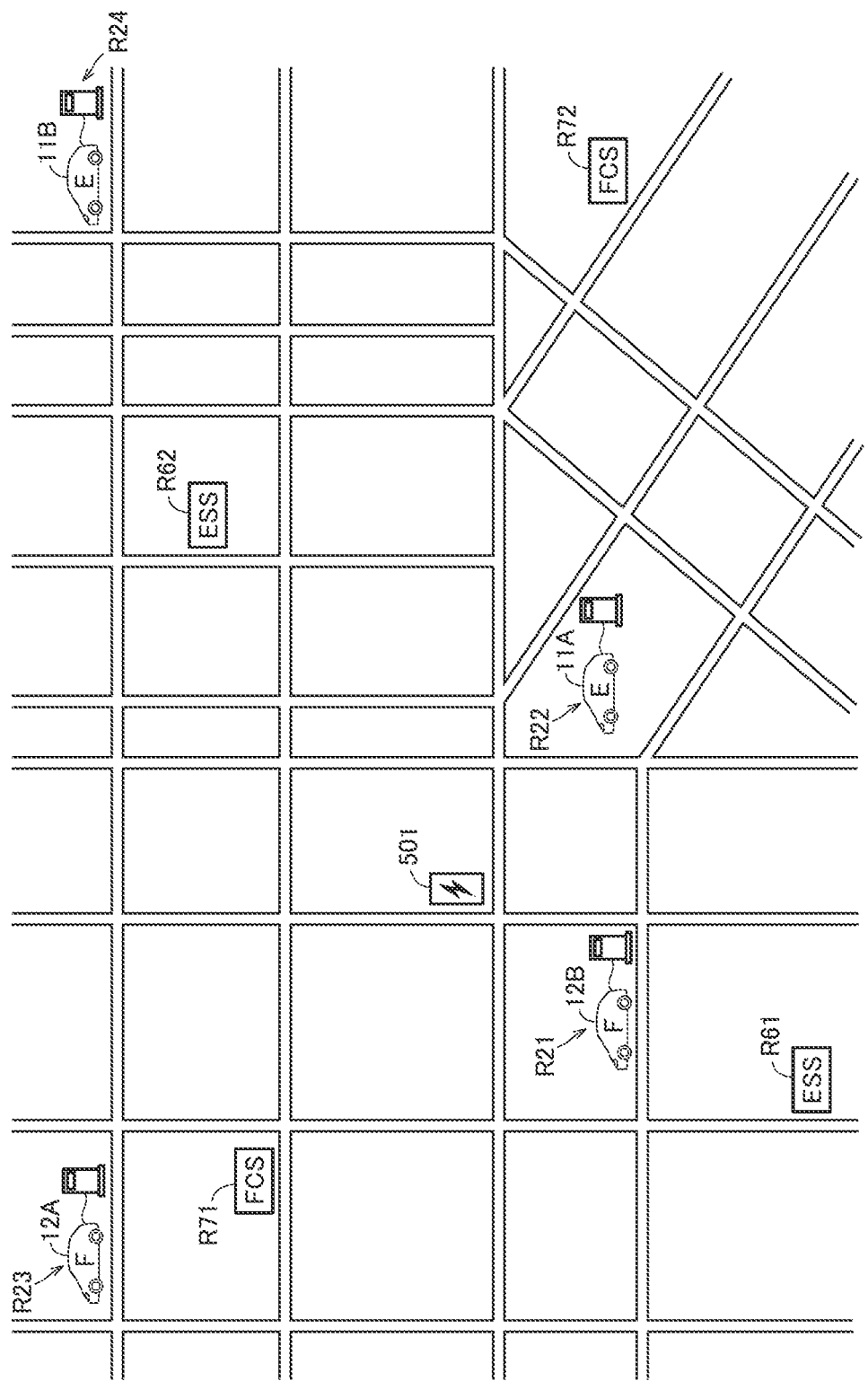
FIG. 4 is a diagram showing a first example of arrangement of a power adjustment resource around a power reception and transformation facility (grid-connection point) shown in FIG. 1.

FIG. 4 is a diagram showing a first example of arrangement of a DER around power reception and transformation facility 501 (grid-connection point). Each power adjustment resource (which is simply denoted as "R" below) shown in FIG. 4 is included in DER group 500. Each of R21, R22, R23, and R24 is formed by connection of the BEV or the FCEV to EVSE 20 shown in FIG. 1. R21, R22, R23, and R24 include FCEV 12B, BEV 11A, FCEV 12A, and BEV 11B shown in FIG. 1, respectively. Each of R61 and R62 corresponds to ESS 60 shown in FIG. 1. Each of R71 and R72 corresponds to FCS 70 shown in FIG. 1.

Referring to FIG. 4, the grid-connection point distance (a distance from power reception and transformation facility 501) of each DER increases in the ascending order of R21, R22, R71, R61, R62, R23, R72, and R24.

Figure 5:
FIG. 5 is a diagram showing priority in selection of a master in isolation switching in a power management method according to the embodiment of the present disclosure.

FIG. 5 is a diagram showing priority in selection of the master in isolation switching in each DER shown in FIG. 4. R21 to R24, R61, R62, R71, and R72 in FIG. 5 are the same as in FIG. 4. In FIG. 5, the "distance" means the grid-connection point distance and the "output" means maximum output power. A to H in FIG. 5 represent the descending order of A to H.

Referring to FIG. 5, the capacity (kWh) of the DERs shown in FIG. 4 decreases in the order of R62 (A), R71 (B), R61 (C), R72 (D), R21/R22/R23 (E), and R24 (F).

Referring to FIG. 3 together with FIGS. 4 and 5, in S13, second switching unit 114 (FIG. 2) selects R62 highest in capacity as the master. Second switching unit 114 can obtain the capacity of each DER by referring to resource information in storage 120 (FIG. 2). In S13, second switching unit 114 designates as the slaves, R21 to R24, R61, R71, and R72 not selected as the master. Furthermore, second switching unit 114 may add a DER not shown in FIG. 4 as the slave.

Referring again to FIG. 3 together with FIGS. 1 and 2, after processing in S13, in S14, second switching unit 114 switches microgrid MG from the grid-connected operation to the isolated operation. More specifically, second switching unit 114 disconnects microgrid MG by means of a breaker of power reception and transformation facility 501. Microgrid MG is thus disconnected from power grid PG. Second switching unit 114 switches a power control mode of microgrid MG from current control for synchronization with power grid PG to master-slave control. As processing in S14 is performed, a series of processing shown in FIG. 3 ends and processing shown in FIG. 6 which will be described below is started.

Figure 6:
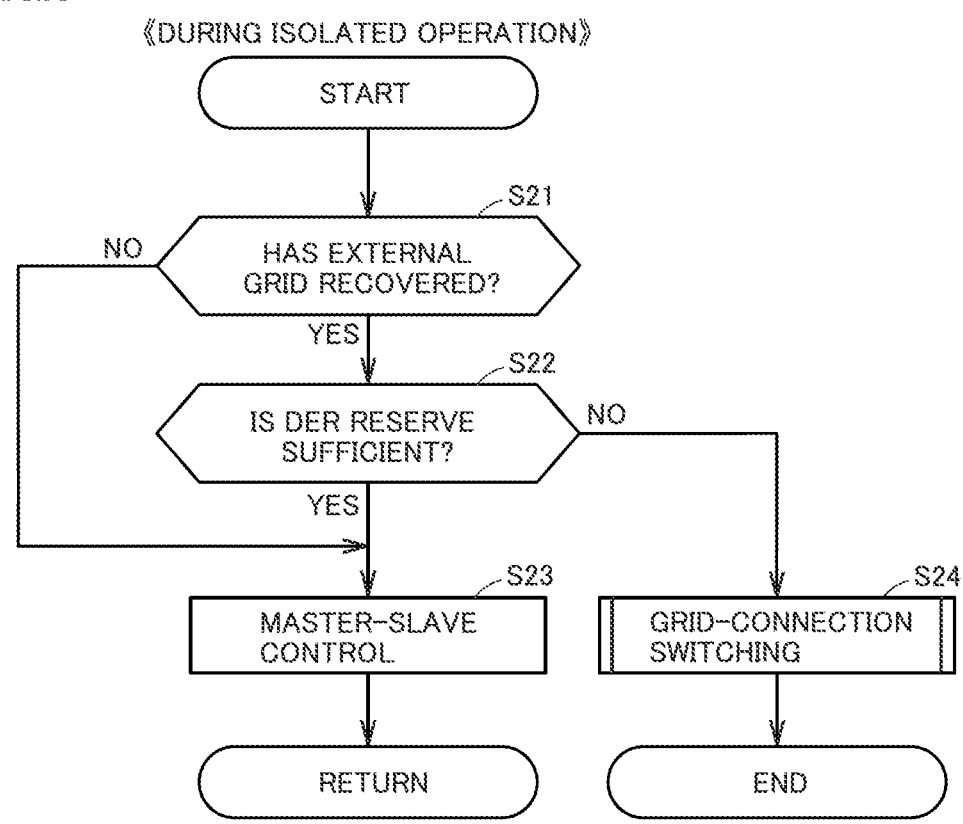
FIG. 6 is a flowchart showing power adjustment control carried out by the server during an isolated operation of the microgrid shown in FIG. 1 in the power management method according to the embodiment of the present disclosure.

FIG. 6 is a flowchart showing power adjustment control carried out by server 100 during the isolated operation of microgrid MG. Referring to FIG. 6 together with FIGS. 1 and 2, in S21, first switching unit 112 determines whether or not power grid PG (external grid) in which a trouble occurred has recovered. When power grid PG has not yet recovered (NO in S21), first switching unit 112 allows the process to proceed to S23 in order to continue the isolated operation.

In S23, second operation unit 113 carries out master-slave control by means of the master and the slave determined in S13 in FIG. 3. Second operation unit 113 controls the master and the slave to stabilize electric power of microgrid MG by sending the adjustment command to each of the master and the slave. The master is operated, for example, for CVCF control. Each slave is operated for current control in accordance with the frequency and the voltage determined by the master. During the isolated operation of microgrid MG, server 100 repeatedly adjusts electric power through processing in S23. Second operation unit 113 may change at least one of the master and the user as necessary. Second operation unit 113 may increase or decrease the number of slaves as necessary.

When power grid PG has recovered (YES in S21), in S22, first switching unit 112 determines whether or not balancing capability of microgrid MG is sufficient. For example, when the reserve DER for keeping quality of electric power of microgrid MG at a prescribed level or higher has been secured, determination as YES is made in S22. When the reserve DER has not been secured, determination as NO is made in S22. When determination as YES is made in S22, first switching unit 112 allows the process to proceed to S23 in order to continue the isolated operation. When determination as NO is made in S22, first switching unit 112 allows the process to proceed to S24 in order to make switching from the isolated operation to the grid-connected operation.

First switching unit 112 thus determines timing to switch microgrid MG from the isolated operation to the grid-connected operation based on balancing capability of microgrid MG while microgrid MG is performing the isolated operation. First switching unit 112 determines whether or not the isolated operation can be continued based on balancing capability of microgrid MG. When the isolated operation can be continued, it is continued. The number of times of grid-connection switching can thus be reduced.

Figure 7:
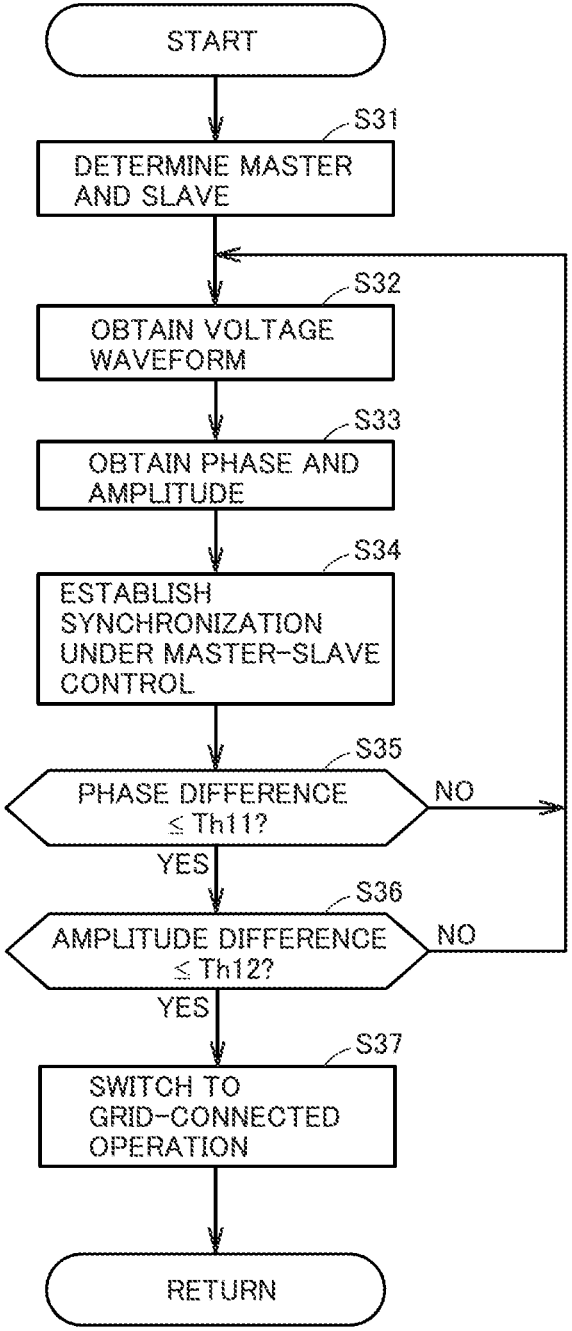
FIG. 7 is a flowchart showing processing involved with grid-connection switching performed by the server in the power management method according to the embodiment of the present disclosure.

In S24, processing shown in FIG. 7 which will be described below is performed. FIG. 7 is a flowchart showing processing involved with grid-connection switching performed by server 100. Referring to FIG. 7 together with FIGS. 1 and 2, in S31, first switching unit 112 determines the master and the slave from DER group 500. A first example of selection of the master in grid-connection switching will be described below with reference to FIGS. 4 and 8. In the description below, it is assumed that each DER shown in FIG. 4 is in a state responsive to the synchronization command from server 100 at processing timing in S31.

FIG. 8 is a diagram showing priority in selection of the master in grid-connection switching for each DER shown in FIG. 4. R21 to R24, R61, R62, R71, and R72 in FIG. 8 are the same as in FIG. 4. A to H in FIG. 8 are the same as in FIG. 5.

Referring to FIGS. 4, 7, and 8, when DERs (DERs that are responsive to the synchronization command) shown in FIG. 4 are master candidates, in S31 in FIG. 7, first switching unit 112 (FIG. 2) excludes a DER a communication rate of which is lower than a first threshold value and a DER maximum output power (kW) of which is lower than a second threshold value from the master candidates (that is, R21 to R24, R61, R62, R71, and R72). In this embodiment, a rate higher than C and lower than B is defined as the first threshold value. Therefore, R21 the communication rate of which is C is excluded from the master candidates. The second threshold value is larger than C and smaller than B. Therefore, R24 maximum output power of which is C is excluded from the master candidates. First switching unit 112 can obtain the communication rate and maximum output power of each DER by referring to resource information in storage 120 (FIG. 2).

In succession, first switching unit 112 (FIG. 2) selects as the master, R22 closest to power reception and transformation facility 501 (grid-connection point) from among remaining master candidates (that is, R22, R23, R61, R62, R71, and R72). First switching unit 112 can obtain the grid-connection point distance of each DER based on resource information (for example, a latitude and a longitude of each DER) in storage 120 (FIG. 2). As the grid-connection point distance is shorter, priority in selection of the master is higher.

A second example of selection of the master in grid-connection switching will now be described with reference to FIGS. 9 and 10. In the description below, it is assumed that each DER shown in FIG. 9 is in the state responsive to the synchronization command from server 100 at processing timing in S31 in FIG. 7.

Figure 9:
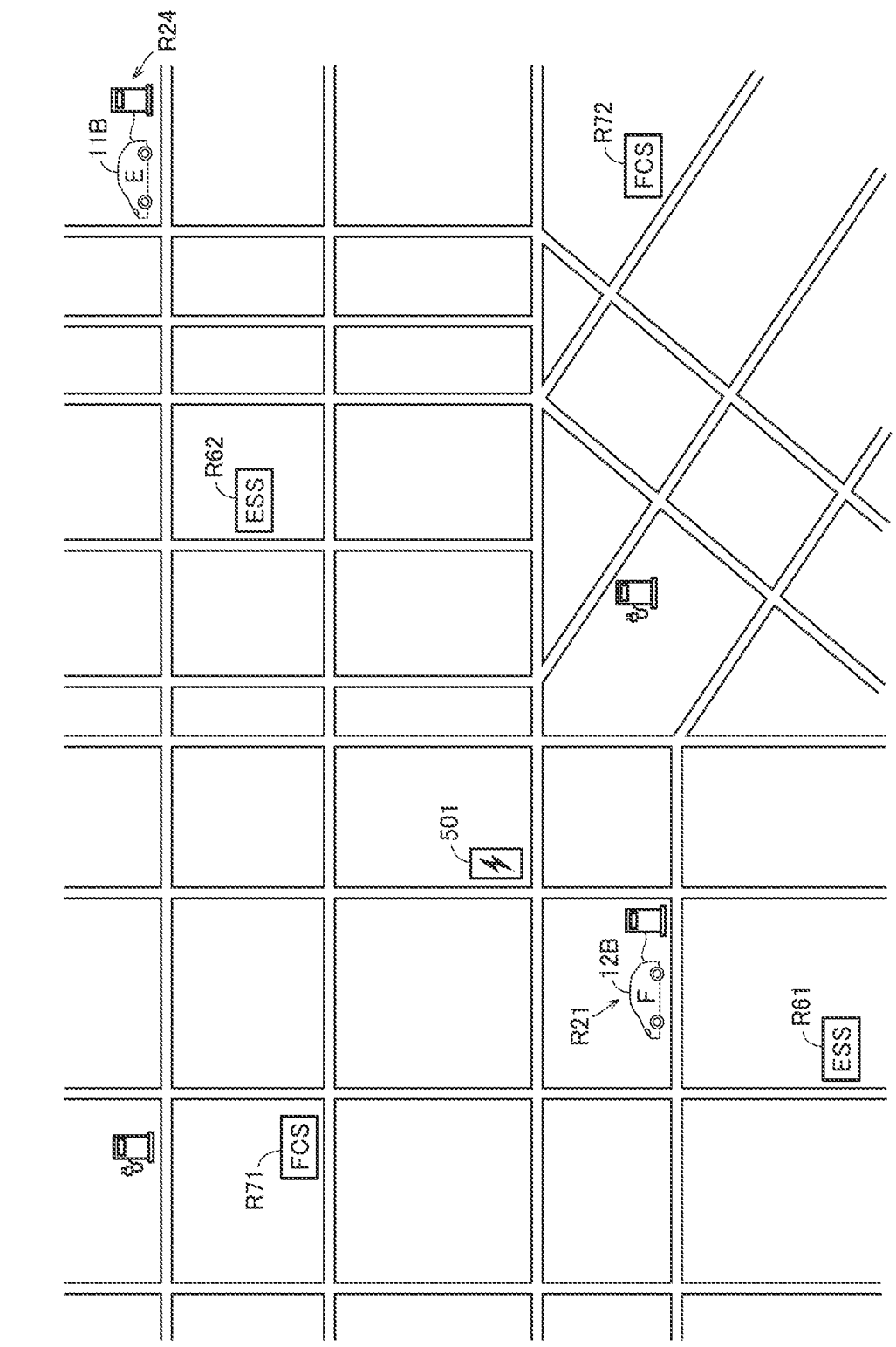
FIG. 9 is a diagram showing a second example of arrangement of the power adjustment resource around the power reception and transformation facility (grid-connection point) shown in FIG. 1.

FIG. 9 is a diagram showing a second example of arrangement of the DER around power reception and transformation facility (grid-connection point) 501. The example in FIG. 9 is the same as the example in FIG. 4 except that R22 and R23 are not formed.

FIG. 10 is a diagram showing priority in selection of the master in grid-connection switching for each DER shown in FIG. 9. A to F in FIG. 10 represent the descending order of A, B, C, D, E, and F.

Referring to FIGS. 7, 9, and 10, when DERs (DERs that are responsive to the synchronization command) shown in FIG. 9 are master candidates, in S31 in FIG. 7, initially, R21 the communication rate of which is lower than the first threshold value and R24 maximum output power (kW) of which is lower than the second threshold value are excluded from the master candidates (that is, R21, R24, R61, R62, R71, and R72). Then, R71 closest to power reception and transformation facility 501 (grid-connection point) is selected as the master from among remaining master candidates (that is, R61, R62, R71, and R72).

Referring again to FIG. 7 together with FIGS. 1 and 2, in S31, first switching unit 112 selects the master as described above from among a plurality of DERs present around the grid-connection point. In S31, first switching unit 112 designates as the slaves, master candidates not selected as the master (that is, DERs priority of which is second highest or lower). Furthermore, first switching unit 112 may add a DER other than the master candidates as the slave.

In S32, first switching unit 112 obtains a voltage waveform of power grid PG, and in S33, first switching unit 112 obtains an amplitude and a phase of the voltage waveform. In S34, first switching unit 112 carries out master-slave control by means of the master and the slave determined in S31. First switching unit 112 controls the master and the slave such that electric power of microgrid MG is in synchronization with electric power of power grid PG by sending the synchronization command to each of the master and the slave. The master is operated, for example, for CVCF control. Each slave is operated for current control in accordance with the frequency and the voltage determined by the master.

In S35, first switching unit 112 determines whether or not a phase difference between electric power of power grid PG and electric power of microgrid MG is equal to or smaller than a prescribed allowable value Th11. In S36, first switching unit 112 determines whether or not an amplitude difference (a voltage difference) between electric power of power grid PG and electric power of microgrid MG is equal to or smaller than a prescribed allowable value Th12. While determination as NO (the difference exceeding the allowable value) is made in any of S35 and S36, S32 to S36 are repeated and master-slave control (S34) is carried out to decrease the phase difference and the amplitude difference. Then, when determination as YES is made in both of S35 and S36, the process proceeds to S37. Determination as YES in both of S35 and S36 means completion of synchronization under master-slave control.

In S37, first switching unit 112 switches microgrid MG from the isolated operation to the grid-connected operation. More specifically, first switching unit 112 allows microgrid MG to be connected to power grid PG by closing a breaker (grid-connection breaker) of power reception and transformation facility 501. First switching unit 112 switches the power control mode of microgrid MG from master-slave control to current control for synchronization with power grid PG. When processing in S37 is performed, the process returns to the flow (S24) in FIG. 6 and a series of processing shown in FIG. 6 ends. As microgrid MG starts the grid-connected operation, the processing in FIG. 3 described previously is started.

As described above, the power management method according to this embodiment is a method of managing electric power of microgrid MG by using a plurality of DERs electrically connectable to microgrid MG, and includes S31, S34, and S37 shown in FIG. 7. In S31, server 100 determines the master and the slave from the plurality of DERs electrically connectable to microgrid MG in switching microgrid MG from the isolated operation to the grid-connected operation with microgrid MG being interconnected with power grid PG. In S31, the DER close to the grid-connection point (the point of connection between microgrid MG and power grid PG) is preferentially selected as the master from among the plurality of DERs. In S34, server 100 carries out master-slave control by means of the master and the slave such that electric power of microgrid MG is in synchronization with electric power of power grid PG. After synchronization under master-slave control, in S37, server 100 allows microgrid MG to be connected to power grid PG.

According to the method, instability of electric power of microgrid MG in switching of microgrid MG from the isolated operation to the grid-connected operation is suppressed.

In the embodiment, in each of S13 in FIG. 3 and S31 in FIG. 7, the master is selected from among the plurality of DERs present around the grid-connection point. In S13 in FIG. 3, however, a DER located at a position distant from the grid-connection point may be selected as the master. For example, when there is a DER high in capacity is present at a position distant from the grid-connection point, in S13 in FIG. 3, that DER high in capacity may be selected as the master.

A plurality of masters may be selected in at least one of S13 in FIG. 3 and S31 in FIG. 7. The plurality of masters may be selected, for example, in the order of higher priority shown in FIG. 5 or 8. Then, under master-slave control, the plurality of masters may operate in coordination to determine the frequency and the voltage of microgrid MG.

A type of the DER used for master-slave control can be changed as appropriate in at least one of S23 in FIG. 6 and S34 in FIG. 7. Server 100 may employ at least one of the EVSE, the ESS, and the FCS provided in house 30 for master-slave control. Alternatively, server 100 may employ at least one of the EVSE, the ESS, and the FCS provided in factory 50 for master-slave control.

In the embodiment, a geographical distance from the grid-connection point to the power adjustment resource is adopted as the grid-connection point distance. Without being limited as such, a length of an electric wire (a power transmission line and a power distribution line) from the grid-connection point to the power adjustment resource may be adopted as the grid-connection point distance. In the embodiment, a rule-based program is adopted. First switching unit 112 may comprehensively evaluate the grid-connection point distance, communication performance, and output performance of each DER included in DER group 500 based on a relational expression obtained by statistical learning by using big data and preferentially select as the master, a DER that achieves a good evaluation result. Instead of the relational expression, a trained model obtained by machine learning by using artificial intelligence (AI) may be employed.

In the embodiment, as server 100 remotely controls the electrically powered vehicle (the BEV and the FCEV)

through wireless communication, the electrically powered vehicle functions as the DER. Without being limited as such, the electrically powered vehicle included in DER group 500 does not have to include a communication apparatus for wireless communication with server 100. Server 100 may have the electrically powered vehicle function as the DER by remotely controlling the electrically powered vehicle through wired communication through EVSE 20. In general, wired communication is higher in communication rate than wireless communication. For example, as BEVs 11A and 11B and FCEVs 12A and 12B shown in FIG. 4 are configured to establish wired communication with server 100 through EVSE 20, the communication rate of each of R21 to R24 shown in FIG. 4 may be set to "A".

FIG. 11 is a diagram showing a modification of the priority in selection of the master in grid-connection switching shown in FIG. 8. R21 to R24, R61, R62, R71, and R72 in FIG. 11 are the same as in FIG. 4. A to H in FIG. 11 are basically the same as in FIG. 8. In this modification, the communication rate of each of R21 to R24 is set to A. Referring to FIG. 11, in this modification, in selection of the master in grid-connection switching, R24 maximum output power of which is C is excluded from the master candidates. Then, R21 closest to power reception and transformation facility 501 (grid-connection point) is selected as the master from among remaining master candidates (that is, R21 to R23, R61, R62, R71, and R72).

In the processing shown in FIG. 6, even when power grid PG recovers, the isolated operation is continued until balancing capability of microgrid MG becomes insufficient. Without being limited as such, grid-connection switching may be made immediately after recovery of power grid PG. Since a trouble may occur again immediately after recovery of power grid PG, the isolated operation may be continued until power grid PG is stabilized.

Figure 12:
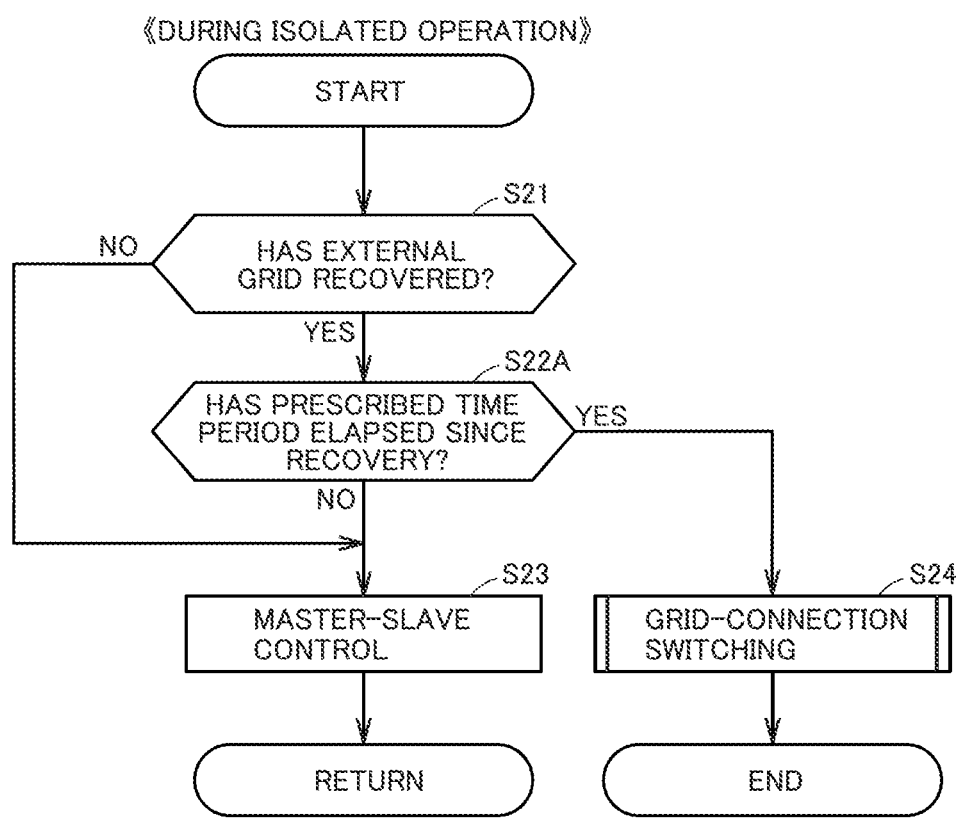
FIG. 12 is a diagram showing a modification of processing shown in FIG. 6.

FIG. 12 is a diagram showing a modification of the processing shown in FIG. 6. Processing shown in FIG. 12 is the same as the processing shown in FIG. 6 except that S22A is adopted instead of S22 (FIG. 6). S22A will be described below.

Referring to FIG. 12 together with FIGS. 1 and 2, when power grid PG (external grid) has recovered (YES in S21), in S22A, first switching unit 112 determines whether or not a prescribed time period has elapsed since recovery. When the prescribed time period has not elapsed since recovery (NO in S22A), first switching unit 112 allows the process to proceed to S23 in order to continue the isolated operation. When the prescribed time period has elapsed since recovery (YES in S22A), first switching unit 112 allows the process to proceed to S24 in order to make switching from the isolated operation to the grid-connected operation.

As in the modification above, server 100 may continue the isolated operation until the prescribed time period elapses since recovery of power grid PG. Then, when the prescribed time period has elapsed since recovery of power grid PG, server 100 may make grid-connection switching.

When the electrically powered vehicle (for example, the BEV or the FCEV) is designated as the master in S31 in FIG. 7, first switching unit 112 may carry out negawatt DR for microgrid MG before master-slave control for synchronization. Negawatt DR refers to demand response (DR) for requesting a demand side to reduce demand. FIG. 13 is a diagram showing a modification of the processing shown in FIG. 7. In this modification, S41 to S43 shown in FIG. 13 are added between S31 and S32 in the processing shown in FIG. 7. S41 to S43 will be described below.

Referring to FIG. 13 together with FIGS. 1 and 2, after processing in S31, in S41, first switching unit 112 determines whether or not the master designated in S31 is the electrically powered vehicle. When the electrically powered vehicle has not been designated as the master (NO in S41), the process proceeds to S32 (see FIG. 7). When the electrically powered vehicle has been designated as the master (YES in S41), in S42, first switching unit 112 carries out negawatt DR for microgrid MG. First switching unit 112 requests a user (demand side) of at least one DER included in DER group 500 to reduce demand of microgrid MG in response to negawatt DR. How much demand of microgrid MG is to be reduced in response to negawatt DR may be determined in accordance with the capacity (kWh) of the master. A negawatt DR signal that requests for reduction in demand of microgrid MG may be sent from server 100 to the EMS that manages the DER or to a terminal (for example, portable terminal 10) of the user of the DER. In S43, first switching unit 112 determines whether or not reduction in demand of microgrid MG in response to negawatt DR has been completed. When negawatt DR in S42 has been completed (YES in S43), the process proceeds to S32 (see FIG. 7).

In the modification, when the electrically powered vehicle has been designated as the master, first switching unit 112 requests a user of at least one DER included in DER group 500 to reduce demand of microgrid MG before master-slave control for synchronization. As demand of microgrid MG is reduced before synchronization under master-slave control, lowering in accuracy in synchronization due to insufficient capacity of the master is suppressed.

Server 100 may control DER group 500 in coordination with another server. DERs included in DER group 500 may be grouped and a server (for example, a server that manages DERs within the group) may be provided for each group. For example, a server that controls an EMS may be provided for each EMS. Then, server 100 may control DER group 500 through the server for each group.

The configuration of the electrically powered vehicle adopted as the power adjustment resource is not limited to the configuration shown in the embodiment. For example, a plug-in hybrid electric vehicle (PHEV) may be adopted as the power adjustment resource. The electrically powered vehicle may be configured to be wirelessly chargeable. The electrically powered vehicle is not limited to a passenger car, and a bus or a truck may be applicable. The electrically powered vehicle may be an autonomous vehicle or may perform a flying function. DER group 500 may include an electrically powered vehicle that can travel without human intervention (for example, an automated guided vehicle (AGV) or an agricultural implement).

The power adjustment resource is not limited to the DER shown in FIG. 1. For example, an induction generator with a flywheel may be adopted as the power adjustment resource.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A server that manages electric power of a first power grid, the first power grid being configured to be connected to and disconnected from a second power grid, the server being configured to:

manage a plurality of power adjustment resources electrically connectable to the first power grid; and switch the first power grid from an isolated operation to a grid-connected operation, the first power grid being interconnected with the second power grid in the grid-connected operation, the server being configured to, in switching the first power grid from the isolated operation to the grid-connected operation, determine a master among master candidates including the plurality of power adjustment resources based on a first parameter, the first parameter including a distance from a grid-connection point to the power adjustment resource, the grid-connection point being a point of connection between the first power grid and the second power grid, designate as slaves, all of the master candidates not selected as the master, and allow the first power grid to be connected to the second power grid after master-slave control by means of the master and the slaves such that electric power of the first power grid is in synchronization with electric power of the second power grid, the server being configured to, in switching the first power grid from the grid-connected operation to the isolated operation, determine a master among master candidates including the plurality of power adjustment resources based on a second parameter different from the first parameter, the second parameter including capacity of the power adjustment resource, designate as slaves, all of the master candidates not selected as the master, and allow the first power grid to be disconnected from the second power grid after selection of the master and the slaves, and the server being configured to control the master and the slaves to stabilize electric power of the first power grid during the isolated operation of the first power grid.

2. The server according to claim 1, wherein
the first parameter further includes communication performance and output performance of the power adjustment resource, and
the server is configured to
exclude a first power adjustment resource and a second power adjustment resource from power adjustment resources that are responsive to a synchronization command, the first power adjustment resource having a communication rate lower than a first threshold value, the second power adjustment resource having maximum output power lower than a second threshold value, and
select as the master, one power adjustment resource closest to the point of connection from among remaining power adjustment resources after the exclusion.

3. The server according to claim 1, wherein
the plurality of power adjustment resources include an electrically powered vehicle.

4. The server according to claim 3, wherein
the plurality of power adjustment resources further include a stationary power storage, and
the server is configured to request, when the electrically powered vehicle is designated as the master, a user of at least one power adjustment resource included in the plurality of power adjustment resources to reduce demand of the first power grid before the master-slave control.

5. The server according to claim 3, wherein
the electrically powered vehicle is a fuel cell electric vehicle.

6. The server according to claim 1, wherein
the server is configured to determine timing to switch the first power grid from the isolated operation to the grid-connected operation based on balancing capability of the first power grid during the isolated operation of the first power grid.

7. The server according to claim 1, wherein
the first power grid is a microgrid,
the second power grid is a commercial power grid provided by an electric utility,
each of the plurality of power adjustment resources includes a power conversion circuit, and
in the master-slave control, the master electrically connected to the first power grid carries out voltage control by means of the power conversion circuit and the slave electrically connected to the first power grid carries out current control by means of the power conversion circuit.

8. The server according to claim 1, wherein
the server is configured to, in switching the first power grid from the isolated operation to the grid-connected operation, carries out the master-slave control by sending the synchronization command to each of the master and the slave, and
in the master-slave control, the master is operated constant voltage constant frequency control, and each of the slaves is operated for current control in accordance with the frequency and the voltage determined by the master.

9. The server according to claim 8, wherein
the server is configured to, in switching the first power grid from the isolated operation to the grid-connected operation,
carry out the master-slave control to decrease a first difference and a second difference, the first difference being a phase difference between electric power of the first power grid and electric power of the second power grid, the second difference being an amplitude difference between electric power of the first power grid and electric power of the second power grid,
determine whether synchronization under the master-slave control has been completed based on the first difference and the second difference, and
allow the first power grid to be connected to the second power grid when synchronization under the master-slave control has been completed.

10. The server according to claim 1, wherein
the server is configured to have a reserve distributed energy resource (DER) operate under current control such that electric power of the first power grid is in synchronization with electric power of the second power grid during the grid-connected operation of the first power grid and the second power grid, the reserve DER being a stationary DER always connected to the first power grid.

11. The server according to claim 10, wherein
the reserve DER includes at least one of an energy storage system (ESS), a fuel cell system (FCS), and a power generator, the ESS being a stationary power storage configured to be chargeable from and dischargeable to the first power grid, the FCS including a stationary fuel cell that generates electric power by chemical reaction between hydrogen and oxygen, the power generator being a stationary generator that generates electric power by using fossil fuel.

12. The server according to claim 1, wherein the server is configured to
   determine whether a trouble has occurred in the second power grid during the grid-connected operation of the first power grid and the second power grid, and switch the first power grid from the grid-connected operation to the isolated operation when the trouble has occurred in the second power grid.

13. The server according to claim 1, wherein the server is configured to, in switching the first power grid from the isolated operation to the grid-connected operation, determine as the master, the power adjustment resource closest to the grid-connection point among master candidates.

14. The server according to claim 1, wherein the server is configured to, in switching the first power grid from the grid-connected operation to the isolated operation, determine as the master, the power adjustment resource highest in capacity among master candidates.

15. A method of managing electric power of a first power grid, the method comprising:
   switching the first power grid from an isolated operation to a grid-connected operation, the first power grid being interconnected with a second power grid in the grid-connected operation; and
   switching the first power grid from the grid-connected operation to the isolated operation, wherein
   switching the first power grid from the isolated operation to the grid-connected operation includes:
      determining a master among master candidates including a plurality of power adjustment resources electrically connectable to the first power grid based on a first parameter, the first parameter including a distance from a grid-connection point to the power adjustment resource, the grid-connection point being a point of connection between the first power grid and the second power grid;
      designating as slaves, all of the master candidates not selected as the master;
      carrying out master-slave control by means of the master and the slaves such that electric power of the first power grid is in synchronization with electric power of the second power grid; and
      connecting the first power grid to the second power grid after synchronization under the master-slave control,
   switching the first power grid from the grid-connected operation to the isolated operation includes:
      determining a master among master candidates including the plurality of power adjustment resources based on a second parameter different from the first parameter, the second parameter including capacity of the power adjustment resource,
      designating as slaves, all of the master candidates not selected as the master, and
      disconnecting the first power grid from the second power grid after selection of the master and the slaves, and
   the method further comprising:
      controlling the master and the slaves to stabilize electric power of the first power grid during the isolated operation of the first power grid.

* * * * *